E. A. MELLINGER.
TELEPHONE TESTING SYSTEM.
APPLICATION FILED JULY 10, 1909.

1,113,937.

Patented Oct. 13, 1914
2 SHEETS—SHEET 1.

Fig. 1.

Witnesses.
P. H. Birfield
A. Andersen.

Inventor:
Edward A. Mellinger,
By Bulkley, Durand & Drury.
Attorneys.

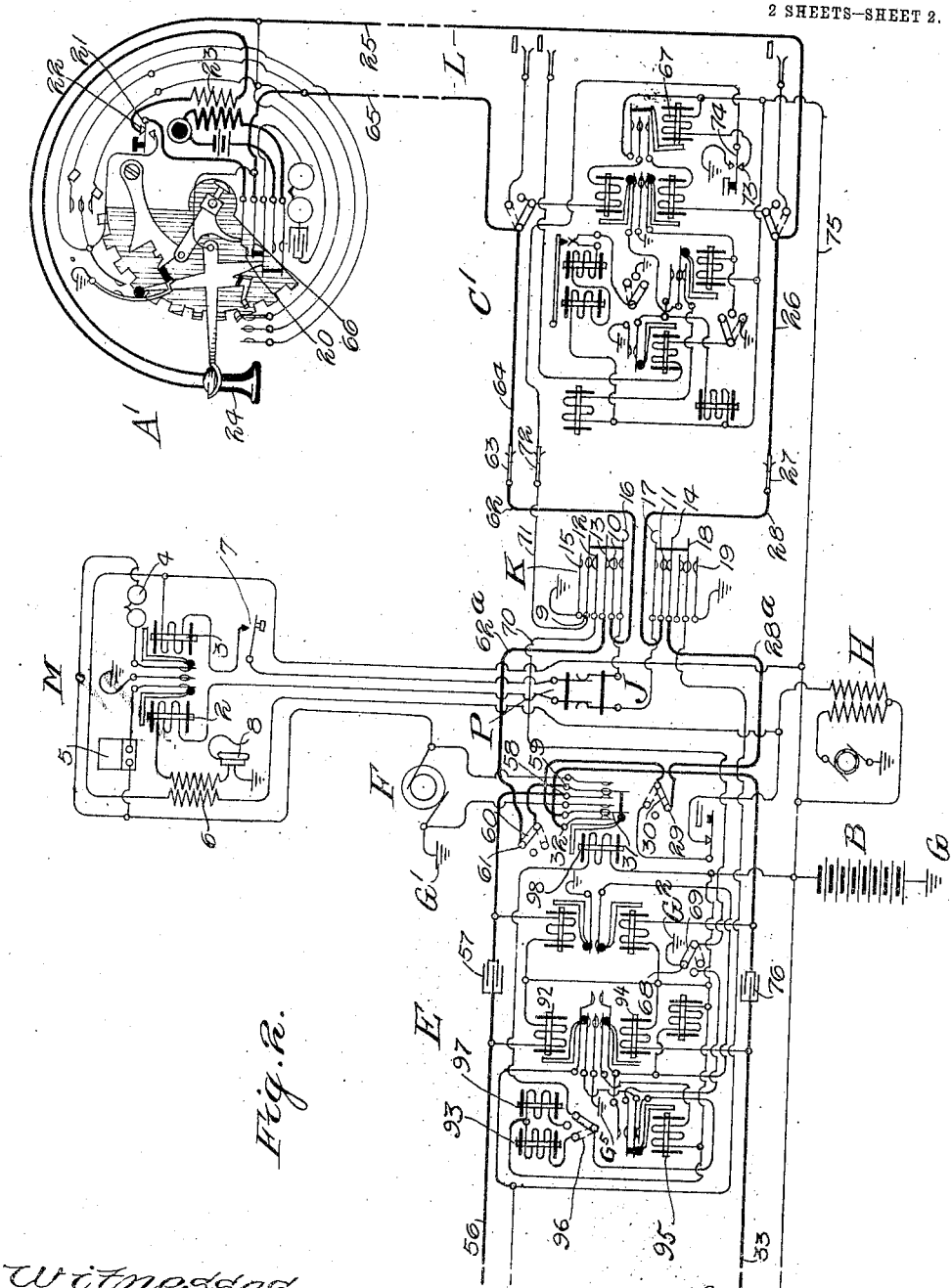

UNITED STATES PATENT OFFICE.

EDWARD A. MELLINGER, OF CHICAGO, ILLINOIS, ASSIGNOR TO AUTOMATIC ELECTRIC COMPANY, OF CHICAGO, ILLINOIS, A CORPORATION OF ILLINOIS.

TELEPHONE-TESTING SYSTEM.

1,113,937.     Specification of Letters Patent.     Patented Oct. 13, 1914.

Application filed July 10, 1909. Serial No. 506,928.

*To all whom it may concern:*

Be it known that I, EDWARD A. MELLINGER, a citizen of the United States of America, and resident of Chicago, Cook county, Illinois, have invented a certain new and useful Improvement in Telephone-Testing Systems, of which the following is a specification.

My invention relates to automatic or semi-automatic telephone exchange systems of that character in which connectors are employed for completing the final connections with the lines of the called subscribers.

It relates more particularly to that form of connector in which the terminals of the subscribers' lines are arranged in semi-circular rows, one above the other, and in which connection with any one of said terminals is established by first raising a set of wipers to the desired row or level, and by then rotating the said wipers until the terminal of the desired line is found. In automatic systems this vertical and rotary motion of the connector is under the control of the calling subscriber. In a semi-automatic system the connector may be controlled by an operator. In systems of this kind it is necessary, of course, to test the subscribers' lines with a view to ascertaining whether the same are in working condition. Prior to my invention this kind of testing was accomplished at what is known as the cross-connecting frame, and was done by hand. This method was, however, found to be somewhat slow and unsatisfactory in various ways. My invention contemplates, therefore, the provision of an arrangement whereby the wipers of one or more of the connectors in an exchange of this character may be employed for connecting the test set with the different subscribers' lines, whereby the desired tests are made as the wipers of the connector pass from line to line. Ordinarily these connectors are divided into groups, and my invention contemplates the use of one connector for each group for the additional purpose of testing the subscribers' lines of that group. As herein disclosed, each connector to be so employed is provided with a test jack, and with a key switch adapted, when operated, to simultaneously connect the wipers of the connector with the said jack and disconnect the same from the trunk line conductors leading thereto. This, of course, leaves the said connector wipers connected only with the test set, assuming the plug of the latter to have been inserted in the said jack, and the connector wipers can then be operated by hand to make the desired test. In making such a test the attendant simply moves the wipers along the different rows or levels of line terminals, thus testing the lines rapidly, one after the other, as the wipers pass from contact to contact. I do not, however, limit myself to this exact construction and mode of operation, as it is obvious that other ways may be employed for using the connectors as a medium for testing the subscribers' lines.

In the accompanying drawings Figures 1 and 2 show diagrammatically the central station apparatus brought into use by one subscriber calling another, showing also the special testing apparatus which is normally disconnected when not in use, in a system embodying the principles of my invention; and in Fig. 1 is shown a substation A, a first selector C and a second selector D with their connecting conductors; and in Fig. 2 is shown a connector E of some group of one-hundred lines, of which group the substation A', line L and corresponding numerical selector C' is an integral part. Included with the connector E is shown the test key K, the jack J, the plug P, the testing apparatus common to all of the lines, including the relays 2 and 3, the bell 4, the buzzer 5, the induction coil 6, the push button 7 and head receiver 8, as hereinafter described.

The selector and connector switches shown herein are of the general type disclosed in United States Letters Patent to Keith, Erickson & Erickson, Nos. 815,321 and 815,176, respectively, granted March 13, 1906.

The test set shown (see Fig. 2) is designed for use in making tests of lines from a connector switch in each hundred. The object is to find the lines in which trouble exists, and the nature of the trouble. For such testing the set is provided with the aforesaid relays 2 and 3 having springs of different tension, one of which relays closes a generator circuit through a bell 4, and the other through a buzzer 5. The induction coil 6, provided for special tests, as will be hereinafter set forth, is of any approved general type. The head receiver 8 is well known, as is also the push button 7, the key K, the jack J and plug P, the key being one-way and self locking in character, and the jack and plug being of the two-wire type. The testing apparatus arranged in the group M (Fig. 2) may be inclosed in a portable box fitted to be hung in some convenient place while testing on a board. In such case the receiver will be connected by a flexible two-conductor cord to some terminal on the box; also, the plug cord of the plug P will be connected to terminals on the box. A flexible cable may also be suitably connected to the terminals of the battery and generator from the box. The push button may be placed in any convenient position on the box. The test key can be fastened to the top of the left bank of the testing connector by its bank rod nut. If desired, the test set M may be permanently located in one place, with the exception of the head telephone 8, and in this case the two terminals will be multipled from board to board to the key at each test connector, the plug and jack J being omitted (see Fig. 2), and a special cut-in plug and jack being provided for connecting the head telephone at each board. For operating and testing purposes a battery B is provided with its positive terminal preferably grounded at G. A source of ringing current is provided at F with one terminal preferably grounded at G'. A busy signaling device H is also provided. It will be seen that this testing set is shown in connection with a so-called three-wire bridging connector, trunk-releasing automatic system, with three-wire substations normally having a condenser in series with the ringer across the line. However, this testing set may be applied as shown in its essential features for the testing of any lines in any telephone system comprising metallic lines connected to substations using a connector switch for connection to the called line.

In its normal position the test key K leaves the circuit of the test connector E unchanged, and the connector is used in making calls exactly the same as other connectors on the board. When the key K is depressed the private, vertical and rotary wiper key spring contacts 9, 10 and 11, respectively, are forced out of engagement with the spring contact points 12, 13 and 14 and into engagement with the spring contacts 15, 16 and 17, thus disconnecting the three wiper cords from the connector switch and connecting the testing box terminals to the vertical and rotary lines, and connecting the private wiper to ground, thus energizing the bridge-cut-off relay of the line with which the wipers are connected, and cutting off the battery at the first selector of said line, clearing the conductors from disturbing potentials at the central office. Also, when the key K is depressed the spring 18 makes contact with the spring 19, thus connecting ground to release trunk leading from the connector to the selector banks, and establishing a guarding potential at the private bank contact to prevent a selector from seizing this connector.

To make clear the purposes of this invention I will now describe several tests, the method of making them, and how the troubles appear at the test box, and will further make clear the general usefulness of my test box. It is assumed that the testing connector switch shaft is rotated by hand over all the contacts in each level, the relays having been previously adjusted for detecting the different troubles. It is assumed that the relay 2 is adjusted to operate on any normal line—that is, on a line the loop resistance of which, including the resistance of the bell, is not above a certain limit. Further, the relay 3 is assumed to be adjusted for operating only when the line resistance is below a certain normal limit, such lines as are under consideration being without condensers at the substation. It will be understood that metallic lines only are under consideration. The tests will show up the following line conditions: Opens, shorts or normally closed lines, as for example, when the receiver is off the hook, crosses with main battery, as for example, when one line is crossed with another, and grounds. These troubles are sufficiently well known not to require further explanation. The attendant will preferably make the test at a time when as few lines as possible are in service. He will place the test box in a convenient position so that the push button is easily accessible. Rotating the switch by hand he will proceed to make the test as follows: First he waits until the connector switch is idle. Then he depresses the key K, locking it, with the result heretofore explained. Also, he connects the plug P with the jack J. Holding the push button down while he advances the wipers from contact to contact, and with the private wiper set slightly in advance of the line wipers, he makes note of any trouble or troubles which he may detect as he passes from line to line, always closing the push button when in contact with the line. Thus, if a line is open the circuit for the relays 2 and 3 is not closed on closing the push button, and consequently no buzz is heard. If a line is short-circuited both buzzer and bell are heard. If a line is grounded on the vertical side, with the push button up, only the bell will be heard. If a line is crossed, or has battery potential on it, the buzzer will operate independently of the push button 7. Suppose the attendant is using the head telephone receiver. Then he has a further aid to testing the lines. When a line is grounded on the rotary side he will get a very loud busy test. These are a few of the tests which can be made with my test set on lines without condensers.

On lines having condensers at the telephone the operator must use the head telephone or no continuity test could be made, since the relays cannot operate because of the condensers. With the head telephone a weak buzz-test will be heard, depending somewhat upon the capacity of the line. Suppose all the lines have condensers. If a line is short-circuited both relays operate, ringing both bell and buzzer and giving a strong buzz-test. If a line is open neither relay operates, and a very weak buzz-test is heard, depending upon the capacity of the line. If a line is crossed on the rotary side the relay 2 may operate and the busy will be heard when the push button 7 is pressed. If a line is grounded on the vertical side the relay 3 will operate, ringing the bell, and the buzz-test will be heard in the head telephone much stronger than usual. If a line is grounded on the rotary side the buzz-test will be strong with the button 7 pressed. Of course, it is understood that a normal line gives no buzz-test with the button 7 pressed. These are a few of the troubles which may be detected easily with the aid of my test box in combination with my test connector.

To make it clear that my test box and accessory apparatus at the connector does not interfere with the regular use of the connector, I have shown one line in connection with another line through a test connector. The attendant, it is understood, can readily see when a connector is busy by the position of the switch shaft, so that the testing apparatus is never used when the switch is busy.

The manner in which a connection is established between a calling and a called substation in a system of the general character shown herein is fully described in United States Letters Patent No. 866,639, issued to E. D. Fales on September 24, 1907. I will, however, explain in a general manner how the connection shown in the accompanying drawings is established. After the subscriber at substation A removes his receiver he operates his calling device once for each of the digits of the number of the called substation, which, in this instance, will be assumed to be 2220. When the substation calling device is operated for the first digit 2, the teeth of the impulse wheel 84 cause the so-called vertical impulse spring 81 to be pressed into engagement with the ground spring 83 twice, after which the rotary impulse spring 82 is forced into contact with said ground spring once. Each time the spring 81 engages the ground spring 83 an impulse is transmitted from the substation ground $G^3$ over the vertical line conductor 48, and through the vertical line relay 85 of the selector C to the battery B (Fig. 2). Each time the relay 85 energizes it closes a circuit from ground $G^4$ through the vertical magnet 86 to the battery, thus causing the vertical magnet to operate twice to raise the shaft wipers two steps to a position opposite the bank level containing the terminals of the trunk lines leading to the group of second selector switches which have access to the connectors which connect with the line of substation 2220. The grounding of the rotary impulse spring 82 at the substation now transmits an impulse over the rotary line 41 and through the rotary line relay 87 to battery. The rotary line relay, upon energizing, momentarily closes a circuit through the private magnet 88. The private magnet, upon energizing and deënergizing, causes the side switch to pass from first to second position, whereupon the side switch wiper 99 closes a circuit through the rotary magnet 89. The rotary magnet then operates in a well-known manner to rotate the wipers 51 and 38 onto the contacts of the trunk line leading to an idle second selector D, after which the side switch passes to third position. The calling subscriber now operates his calling device for the second digit 2, thereby again grounding the vertical line 48 twice and the rotary line 41 once. Since the side switch of the first selector is now in third position these impulses, instead of passing to the vertical and rotary relays 85 and 87 of the selector C, pass through the line wipers 51 and 38 and through the relays 90 and 91 of the selector D. The selector D operates in response to these impulses in the same manner as explained for the selector C to extend the connection over the trunk line conductors 56 and 33 to the connector E (Fig. 2). The calling subscriber now operates his calling device for the third digit 2. The two vertical impulses for this digit pass through the selectors C and D, trunk line conductor 56, and thence through the vertical line relay 92 of the connector E to battery. The relay 92 is energized twice by these impulses and transmits two impulses from ground $G^5$ through the vertical magnet 93. The vertical magnet 93 operates in response to these impulses to raise the shaft wipers 63, 72 and 27 to a position opposite the second bank level. The rotary impulse for this third digit passes over the rotary line 41, trunk conductors 37 and 33, and through the rotary line relay 94 of the connector E to battery. The relay 94, upon operating, momentarily closes the circuit of the private magnet 95, which in turn operates to cause the side switch to pass to second position. In the second position the side switch wiper 96 places the rotary magnet 97 under the control of the vertical line relay 92. Thus, when the substation calling device is operated for the last digit O the vertical line relay 92, operating in response thereto, closes the circuit of the rotary magnet 97 ten times. The rotary magnet, upon operating, rotates the shaft wipers ten steps onto the contacts of the desired line. The rotary impulse for the last digit causes the rotary relay 94 to again close the circuit of the private magnet 95, which in turn causes the side switch to move another step into third position. This movement of the side switch of the connector to third position, after the wipers of the said connector have been rotated onto the contacts of the desired line, completes the connection between the calling and the called substations. The calling subscriber may now cause the bells at the called substation to be rung by pressing the ringing button 45. This grounds the vertical line 48, which again causes the vertical relay 92 of the connector E to be energized. Since the side switch of the connector is in third position, the energization of the relay 92 at this time closes a circuit through the ringing relay 98, which operates to connect the ringing current generator F with the called line.

When subscriber A has called subscriber A' (the latter not having answered), the talking circuit through a test connector will now be traced, it being understood that the substations are local battery. Commencing with the switch hook spring 20 at the substation A', the circuit extends through the ringing button 21, contact point 22, secondary winding 23, receiver 24, line conductor 25, normal conductor 26, shaft wiper 27, wiper cord 28 of the test connector E, springs 11 and 14 of the key K, wiper cord 28ª, side switch contact point 29, side switch wiper 30 to the ringer springs 31 and 32, condenser 76, trunk conductor 33 to the second selector D, shaft wiper 34, contact point 35, side switch wiper 36, trunk conductor 37 to the first selector C, shaft wiper 38, contact point 39, side switch wiper 40, line conductor 41, receiver 42, ringing button 45, switch hook springs 46 and 47, line conductor 48, side switch wiper 49, contact point 50, shaft wiper 51, trunk conductor 52, side switch wiper 53, contact point 54, wiper 55, trunk conductor 56, condenser 57, ringer springs 58 and 59, side switch wiper 60, contact point 61, wiper cord 62ª, springs 13 and 10 of the key K, wiper cord 62, shaft wiper 63, normal conductor 64, line conductor 65 to the switch hook spring 66, thence to starting point when subscriber A' answers. The energizing circuit for the bridge-cut-off relay 67 will now be traced to show that this circuit is in no way affected by the insertion of the key K at the test connector. It extends from ground G² to the side switch contact point 68, side switch wiper 69, conductor 70, spring contacts 12 and 9, conductor wiper cord 71, shaft wiper 72, off normal spring 74, contact 73, bridge-cut-off relay 67 to battery lead 75, thence through battery B to ground G.

From the foregoing it will be seen that I provide means whereby an automatic connector may be used for testing the subscribers' lines terminating in the banks or levels thereof. The connectors may, of course, as is usual in telephone systems of this kind, be divided into groups, say ten connectors for each group of one hundred subscribers. One connector in each group can then be equipped with the provisions herein disclosed for testing the lines of that group. Each test connector is provided with a test jack, and with a key for simultaneously connecting the jack with the wipers of a connector and disconnecting the latter from the trunk line leading thereto. Thus all that the attendant who is testing the lines has to do is simply this:—Go to one group of connectors and place the plug of the test set in the test jack of the test connector of that group, and then throw the key switch of the testing connector. The wipers of the connector can then be rotated by hand in the manner described, and all the lines of that group quickly and efficiently tested by the one connection of the test set. The attendant can thus go from group to group, test the lines of each group in the manner described, and thus the work of testing is greatly facilitated. It is obvious, of course, that the connectors can be used for this purpose in different ways without departing from the spirit of my invention. For this reason I do not limit myself to the exact construction and mode of operation disclosed herein.

What I claim as my invention is:—

1. In an automatic or semi-automatic telephone exchange system employing connectors for completing the final connection with the lines of called subscribers, a test set, means for connecting the same with a connector, whereby the said test set may be placed in connection with any of the subscribers' lines terminating in said connector, and means for preventing a connection being extended to said connector while said test set is connected thereto.

2. In a telephone system, a connector having subscribers' lines terminating thereat, means for extending connection to said connector for extending a call to any of said lines, a test set, means for connecting said test set with the said connector, whereby the test set may be placed in connection with any of said lines, and means for preventing a connection being extended to said connector while said test set is connected thereto.

3. In a telephone system, a connector having subscribers' lines terminating thereat, a test jack for said connector, a trunk leading to said connector, a switch for disconnecting the trunk from the connector and connecting the said jack therewith, testing means, and a plug for connecting said testing means with said jack, whereby the connector may be used for placing said testing means in connection with any of said lines.

4. In a telephone system, an automatic switch, a line leading thereto, a plurality of lines leading therefrom, a jack normally disconnected from the said switch, a telephone set connected to said jack, means at the said switch for connecting the jack therewith, and means for preventing a connection being extended to said switch while said jack is connected therewith.

5. In a telephone system, an automatic switch, a line leading thereto, a plurality of lines leading therefrom, a jack normally disconnected from said switch, a telephone set connected to said jack, and means at the switch for connecting the jack therewith and opening the line circuit thereof.

6. In a telephone system, an automatic connector, a line leading thereto, a plurality of subscribers' lines leading therefrom, a bridge for each line leading from the connector, a bridge-cut-off relay for each bridge, and a manual switch at the connector for controlling said bridge-cut-off relays.

7. In a telephone system, an automatic connector, a trunk line leading thereto, subscribers' lines leading therefrom, and means including a manual switch at the connector for establishing a guarding potential to prevent seizure of said trunk line.

8. In a telephone system, an automatic switch provided with a set of line wipers, line terminals to be engaged by said wipers, a line circuit for said switch, a test jack, a test set, and a key switch for opening the line circuit and thereby connecting the said wipers with the said jack, whereby said wipers may then be used for placing said test set in connection with any of said line terminals.

Signed by me at Chicago, Cook county, Illinois, this 2nd day of July, 1909.

EDWARD A. MELLINGER.

Witnesses:
 EDWARD D. FALES,
 ARTHUR J. RAY.